United States Patent [19]

Hydro et al.

[11] 3,998,749
[45] Dec. 21, 1976

[54] CHEMICAL HEATER FORMULATION AND METHOD FOR GENERATING HEAT

[75] Inventors: William R. Hydro, Bel Air; Benjamin Witten, Baltimore, both of Md.

[73] Assignee: The United States of America as represented by the Secretary of the Army, Washington, D.C.

[22] Filed: Sept. 6, 1974

[21] Appl. No.: 504,009

[52] U.S. Cl. .................................. 252/70; 44/3 R; 126/263; 252/188.3 R
[51] Int. Cl.$^2$ ........................ C09K 5/00; F24J 1/04
[58] Field of Search ...................... 252/70, 188.3 R; 126/263; 44/3 R

[56] References Cited

UNITED STATES PATENTS

| | | | |
|---|---|---|---|
| 2,541,345 | 2/1951 | Navarke et al. | 126/123 X |
| 2,573,791 | 11/1951 | Howells | 126/123 X |
| 2,680,063 | 1/1954 | Shapiro | 252/70 X |
| 3,461,073 | 8/1969 | Crowell | 252/70 |

FOREIGN PATENTS OR APPLICATIONS

| | | | |
|---|---|---|---|
| 100,985 | 5/1937 | Australia | 44/3 R |

Primary Examiner—Mayer Weinblatt
Assistant Examiner—John D. Smith
Attorney, Agent, or Firm—Nathan Edelberg; Kenneth P. Van Wyck

[57] ABSTRACT

The invention relates to a unique chemical heater formulation for generating heat through the exothermic reduction of cupric chloride by aluminum. The chemical reaction system used in the heater formulation contains a cupric chloride, a wetting agent, water and a polar organic solvent for said cupric chloride which when contacted with aluminum will react to produce temperatures in excess of 100° C for a sustained period of time, with peak temperature reaching the order of 156° C. Optimum results have been achieved with a reaction system consisting essentially of cupric chloride dihydrate, 48.4wt%; polyethylene glycol 1.6 wt%; water 9.7 wt% and ethylene glycol, 40.3wt%.

8 Claims, No Drawings

CHEMICAL HEATER FORMULATION AND METHOD FOR GENERATING HEAT

BRIEF SUMMARY OF THE INVENTION

The desireability of having a portable heating means which can operate independently on its own self-contained power source has long been recognized by those working in the related heater fields.

In answer to this need for a portable heater, the art has developed and relied primarily upon two basic classes of heaters, namely, the battery operated heater and the catalytic heater. Both of these classes of portable heaters have achieved a limited degree of success but have demonstrated serious limitation in their overall application to everyday use. The battery operated heater, though generally recognized as reliable, has suffered from its cumbersome size and weight requirements for providing the required degree of heating. Obviously, the cumbersome nature of the battery operated heater has materially hindered its portability in everyday use. The catalytic heater, on the other hand, has the advantage of being compact and readily portable, thus leading to its general acceptance among sportsmen, campers and the like. The catalytic heater, however, has been less than reliable in use due to frequent "poisoning" of the catalyst.

Therefore, the object of this invention is to provide a self-contained heater which is both reliable and readily portable in a number of desired shapes and sizes.

A further object of the invention is to provide a safe, reliable heater for areas where explosives and flammable mixtures are stored without the intendent danger of sparks produced by conventional electrical heaters.

As a further object, the invention fulfills the need for a heater that does not require oxygen and can thus produce heat at high altitude locations, in caves or other confined areas; in cold, windy and rainy locations and even under water.

Still another object of the invention is to provide a heater which has anti-freeze characteristics, thus permitting its use in the Arctic or in winter as a body or equipment warmer.

These and other objects and advantages of the invention will become apparent from the following detailed description of the invention.

DESCRIPTION OF THE INVENTION

The chemical heater of the instant invention makes use of the basic exothermic nature of the reduction of cupric chloride by aluminum according to the following stoichiometric equation:

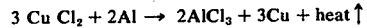

$$3\,CuCl_2 + 2Al \rightarrow 2AlCl_3 + 3Cu + heat \uparrow$$

wherein the cupric chloride is present in an aqueous solution and the reaction proceeds at a vigorous rate. The temperature generated during this reaction is limited, however, by the boiling point of water of solution. Even when employing an optimum aqueous solution of 30% by weight of cupric chloride, applicants have found that the maximum temperature generated by the reaction was 90° C.

Applicants, having been faced with this problem of limited temperature generation, devised a unique reaction system that provides for generation of temperatures in excess of 100° C for a sustained period of time significantly longer than that attainable using the conventional aqueous reaction medium. The reaction system of this invention consists essentially of cupric chloride, a wetting agent, water and a polar organic solvent. This reaction system, in turn, forms the medium for reacting cupric chloride with aluminum in the chemical heater formulation of the invention.

The cupric chloride used in the chemical heater can be in any commercially available form. Anhydrous cupric chloride available from Fisher Scientific Company and the dihydrate form produced by Matheson, Coleman & Bell are particularly useful forms of cupric chloride in the present invention.

The polar organic solvents used in the reaction system are selected from those solvents which readily solubilize cupric chloride and which have a relatively high boiling point with respect to water. Those solvents which have been found especially useful for purposes of this invention are summarized in the following table.

TABLE I

| Solvent | B.P. (° C) |
|---|---|
| 2-ethoxythanol | 135 |
| N,N'-dimethylformamide (DMF) | 153 |
| ethylene glycol | 197 |
| diethylene glycol (DEG) | 245 |

The aluminum in the chemical heater formulation can take varied forms including, among others, aluminum foil, e.g., Reynolds wrap, a 50% aluminum powder-paper pad prepared from Alcoa atomized aluminum powder No. 123 fine mesh and Kraft softwood pulp; Westvaco sandwich sheet containing 80% aluminum, and aluminum powder impregnated with Polyox WSR-35 (a polyhydroxycellulose wafer soluble resin available from Union Carbide Co.) from 0.25% solution in chloroform. The aluminum powder forms are preferred in that they provide the largest surface area of aluminum for reaction with cupric chloride and consequently produce higher exotherms than with either an aluminum foil or an aluminum pad.

An aqueous solution of cupric chloride reacts vigorously with aluminum but the temperature achieved is limited by the boiling point of water. The reaction of aluminum with cupric chloride dissolved in the polar organic solvents, on the other hand, is fairly sluggish but does reach temperatures above 100° C. Thus the present invention provides for the addition of water to the cupric chloride-polar organic solvent formulation to effect shortening of the induction period.

When administered to the aluminum (pad or Polyox treated powder), the cupric chloride solution containing the polar organic solvent was absorbed at a very slow rate. A wetting agent should thus be incorporated into the formulation to increase the rate of penetration. Examples of suitable wetting agents used in the practice of this invention are polyethylene glycol 200 (PEG 200)

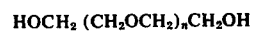

$$HOCH_2(CH_2OCH_2)_nCH_2OH$$

and sodium dioctyl sulfosuccinate (Aerosol)

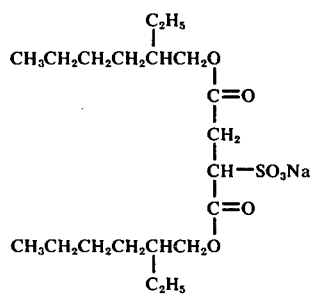

with polyethylene glycol being the preferred wetting agent.

The following examples further illustrate the use of our novel chemical heater formulation and should not be construed to limit our invention in any way.

An iron constantan thermocouple connected to a Bristol Dynamaster Recorder Model 1PG560-21-T84-T4-N3-B6-B7-T66X-T89 was employed to measure the exotherms which, in later experiments, were recorded on chart paper. The thermocouple was placed in aluminum powder contained in a flat bottomed 17 × 63mm glass tube or inserted in a ⅝ inch aluminum disk and lowered into the glass tube. In order to prevent movement, the thermocouple was secured to the side of the tube with a paper clip. With the aid of a loose fitting support, the tube was suspended in a tall 200ml beaker which had been adjusted to convenient sight level. In all experiments exactly 0.3ml of the respective cupric chloride solution was added to the aluminum specimen by means of a syringe. Due to the deposition of free copper, about one-half inch of the thermocouple was snipped after each experiment in order to insecure consistent temperature readings.

The "polyox samples" were prepared by forming a receptacle five-eighths inch in diameter from a 1¼ inch square of aluminum foil, adding the required amount of aluminum powder, wetting with a minimum amount of Polyox solution, stirring, and drying at 65° C.

The results obtained from changes in the cupric chloride formulation and type of aluminum employed are reported below. In all examples, the percentages reported are by weight of the ingredient contained in the formulation.

EXAMPLE 1

The effect of a 30% aqueous solution of $CuCl_2.2H_2O$ on various types of aluminum samples.

| Al Type | Maximum Temperature (° C) |
| --- | --- |
| 50% paper pad | 92 |
| foil | 73 |
| powder | 88 |

EXAMPLE 2

The effect of a wetting agent in an aqueous solution of cupric chloride on various types of aluminum samples. The composition of the stock solution is 3gm $CuCl_2$ (46.1%); 2.5 gm $H_2O$ (38.5%) and 1 gm Aerosol (15.4%).

| Al Type | Maximum Temp. (° C) |
| --- | --- |
| 50% paper pad | 103 |
| foil | 78 |
| powder | 105 |

EXAMPLE 3

The effect of a solution of DMF, water, and cupric chloride on various types of aluminum samples. The composition of the stock solution is 3gm $CuCl_2$ (26.6%); 7gm DMP (61.9%) and 1.3 gm $H_2O$ (11.5%).

| Al Type | Maximum Temp. (° C) |
| --- | --- |
| 50% paper pad | 59 |
| foil | 75 |
| powder | 78 |

EXAMPLE 4

The effect of a solution of 7gm 2-ethoxyethanol (66.7%); 0.5 gm Aerosol (4.8%) and 3gm $CuCl_2$ (28.6%) on various types of aluminum samples.

| Al Type | Maximum Temp. (° C) |
| --- | --- |
| 50% paper pad | 70 |
| foil | 52 |
| powder | 93 |

EXAMPLE 5

The effect of a solution of 7gm diethylene glycol (56.9%); 2.3gm $H_2O$ (18.7%) and 3gm $CuCl_2$ (24.4%) on aluminum samples.

| Al Type | Maximum Temp. (° C) |
| --- | --- |
| 50% paper pad | 41 |
| foil | 54 |
| powder | 125 |

EXAMPLE 6

The effect of a solution of 4gm DEG (40%); 2.5 gm $H_2O$ (25%); 0.5 gm Aerosol (5) and 3gm $CuCl_2$ (30%) on aluminum samples.

| Al Type | Maximum Temp. (° C) |
| --- | --- |
| 50% paper pad | 75 |
| foil | 45 |
| powder | 130 |

EXAMPLE 7

The effect of a homogeneous solution of cupric chloride in ethylene glycol on a 50% aluminum paper pad. Composition of stock solution: 3gm $CuCl_2$ (37.5%); 5gm ethylene glycol (62.5%).

a. No change in temperature in 5 minutes.

b. With the addition of one drop water, the temperature gradually rose to 45° C, held, then reached a peak of 89° C.

EXAMPLE 8

The effect of a solution of DEG, Aerosol, water, and cupric chloride on various amounts of Al powder bound with a 3% solution of Polyox WSR-35 in chloroform. Composition of stock solution: 3gm $CuCl_2$ (30%); 4 gm DEG (40%); 0.5 gm Aerosol (5%) and 2.5 gm water (25%).

| Weight of Al Powder | Maximum Temp. (° C) |
|---|---|
| 0.2 gm | 110 |
| 0.3 gm | 110 |
| 0.4 gm | 108 |

EXAMPLE 9

The effect of varying the composition of a solution of ethylene glycol, Aerosol, water, and cupric chloride on Al powder — 0.3 gm bound with a 0.25% Polyox WSR-35 chloroform solution. Composition of cupric chloride stock solutions:

|  | B | C |
|---|---|---|
| $CuCl_2$ | 3 gm (30%) | 3 gm (42.9%) |
| ethylene glycol | 5.5 gm (55%) | 2.5 gm (35.7%) |
| Aerosol | 1 gm (10%) | 1 gm (14.3%) |
| Water | 0.5 gm (5%) | 0.5 gm (7.1%) |

| Cupric Chloride Solution (0.3 ml) | Temp. Observed |
|---|---|
| B | 13 seconds at 100° – 138° C |
| C | 30 seconds at 100° – 140° C |

EXAMPLE 10

The effect of a solution of ethylene glycol, Aerosol, water, and cupric chloride on various amounts of Al powder bound by a 0.25% Polyox WSR-35 chloroform solution. Composition of stock solution: 3gm $CuCl_2$ (42.9%); 2.5 gm ethylene glycol (35.7%); 1 gm Aerosol (14.3%) and 0.5 gm water (7.1%).

| Weight of Al Powder | Maximum Temperature (° C) |
|---|---|
| 0.2 gm | 93 |
| 0.3 gm | 140 |
| 0.4 gm | 157 |

EXAMPLE 11

The effect of varying the composition of a solution of ethylene glycol, Aerosol, water, and cupric chloride on Al powder — 0.4 gm bound with a 0.25% Polyox WSR-35 chloroform solution. Composition of cupric chloride stock solutions:

|  | C | D |
|---|---|---|
| $CuCl_2$ | 3 gm (42.9%) | 3 gm (42.9%) |
| ethylene glycol | 2.5 gm (35.7%) | 1.5 gm (21.4%) |
| Aerosol | 1 gm (14.3%) | 1.5 gm (21.4%) |
| Water | 0.5 gm (7.1%) | 1 gm (14.3%) |

| Temperature Observations | Cupric Chloride Solution (0.3 ml) |
|---|---|
| 157° C (max) 27 seconds at 100° C or higher | C |
| 120° C (max) 18 seconds at 100° C or higher | D |

EXAMPLE 12

The effect of varying the composition of a solution of ethylene glycol, polyethylene glycol — 200 (PEG-200), and cupric chloride on Al powder — 0.4 gm bound with 0.25% Polyox WSR-35 chloroform solution. Compositions of cupric chloride stock solutions:

|  | E | F |
|---|---|---|
| $CuCl_2$ | 3 gm (42.9%) | 3 gm (46.2%) |
| ethylene glycol | 2.5 gm (35.7%) | 2.5 gm (38.5%) |
| PEG - 200 (10% in $H_2O$) | 1.5 gm (21.4%) | 1 gm (15.4%) |

| Temperature Observation | Cupric Chloride Solution (0.3m) |
|---|---|
| 136° C (max) 38 seconds at 100° C or higher | E |
| 151° C (max) 26 seconds at 100° C or higher | F |

EXAMPLE 13

The effect of a solution of ethylene glycol, PEG-200 (10% in water), and cupric chloride on two different types of aluminum samples. Composition of stock solution is 3 gm $CuCl_2$ (42.9%); 2.5 gm ethylene glycol (35.7%) and 1.5 gm PEG-200 (10% in water) (21.4%)

| Temperature Observations | Al Type |
|---|---|
| 136° C max (38 sec. at 100° C or greater) | 0.4 gm Al powder bound with 0.25% Polyox WSR-35 $CHCl_3$ Solution |
| 138° C max (46 sec. at 100° C or greater) | Westvaco 80% Al sandwich |

EXAMPLE 14

The effect of varying cupric chloride solution compositions on Westvaco 80% Al Sandwich.

| Cupric Chloride Solution | Maximum Temperature | Sec. at 100° C or higher | $CuCl_2 \cdot 2H_2O$ | Ethylene glycol | PEG 200 | Water |
|---|---|---|---|---|---|---|
| F | 146° C | 53 | 3 gm (46.2%) | 2.5 gm (38.5%) | 0.1 gm (1.5%) | 0.9 gm (13.9%) |
| A | 153° C | 80 | 3 gm (48.4%) | 2.5 gm (40.3%) | 0.1 gm (1.6%) | 0.6 gm (9.7%) |
| G | 147° C | 35 | 3 gm (49.2%) | 2.5 gm (41.0%) | — | 0.6 gm (9.8%) |
| H | 149° C | 51 | 2.5 gm (43.9%) | 2.5 gm (43.9%) | 0.1 gm (1.8%) | 0.6 gm (10.5%) |

EXAMPLE 15

The scale up of cupric chloride solution A in example 14 and its effect on Westvaco 80% Al sandwich sheet.

| Maximum Temperature | Sec. at 100° or higher | $CuCl_2 \cdot 2H_2O$ | Ethylene Glycol | PEG 200 | Water |
|---|---|---|---|---|---|
| 158 (Run 1) | 85 (Run 1) | | | | |
| 156 (Run 2) | 90 (Run 2) | 1449.0 gm (48.4%) | 1207.5 gm (40.3%) | 48.3 gm (1.6%) | 289.8 gm (9.7%) |

Solution A (9 ml) remained a dark green homogeneous solution even after standing in a freezer for over 30 days.

As can be seen by the preceeding examples, the reaction between cupric chloride and aluminum is highly exothernic. An aqueous solution of cupric chloride reacts vigorously with aluminum, especially aluminum powder, but the temperature generated is limited by the boiling point of water, as shown in Example 1 and 2. To obtain a higher temperature, the cupric chloride is dissolved in a higher boiling organic polar solvent, particularly glycols.

The reaction of aluminum with cupric chloride dissolved in the polar solvents is fairly sluggish. The addition of water to the cupric chloride formulation has the effect of shortening the induction period, as illustrated in example 7.

The exotherm was also dependent upon the type of aluminum employed, with the observed exotherm for aluminum powder being higher than that for either the aluminum foil or aluminum pad composed of 50% paper (the lowest exotherm). The highest exotherm was attributed to the largest surface area of aluminum, whereas the insulating property of paper was responsible for the lowest exotherm. Aluminum powder bound with as little as 0.25% Polyox WSR — 35 chloroform solution and Westvaco paper sandwich sheet containing 90% aluminum also produced a desireable exotherm of the order of 157° C when treated with the cupric chloride formulation of the present invention.

Variation in the amounts of cupric chloride, water, polar organic solvent; e.g., ethylene glycol, and wetting agent; e.g., PEG-200, produced changes in the speed of reaction, amount and length of exotherm. The most promising, and therefore preferred, test formulation has the following composition:

| Solution | gm | wt% |
|---|---|---|
| Cupric chloride dihydrate | 1449.0 gm | 48.4 |
| Water | 289.8 | 9.7 |
| Ethylene glycol | 1207.5 | 40.3 |
| Polyethylene glycol zoo | 48.3 | 1.6 |

The above solution had a specific gravity of 1.5 and remained a dark green homogeneous solution even after standing in a freezer for over 30 days.

When a 0.3 ml sample of the solution was placed on a ⅝ inch disk cut from a Westvaco 80% aluminum sandwich sheet (average thickness 0.060 inch), a temperature of 100° C was attained in 32 seconds, 156° C in another 13 seconds, followed by a decrease to 100° C in another 77 seconds, thus giving a range 100° to 156° C for a period of 90 seconds.

Applicants having disclosed their invention, obvious modification of the present invention will be apparent to those skilled in the related chemical art and, therefore, desire to be limited only by the scope of the appended claims.

What is claimed is:

1. A chemical heater reactant formulation for generation of an exotherm through the exothermic reduction of cupric chloride by aluminum consisting essentially of a reaction system solution of cupric chloride; ethylene glycol as a solvent for said cupric chloride; and water, and a source of aluminum for initiating said reaction selected from the group consisting of aluminum foil, an aluminum powder-paper pad composition and aluminum powder.

2. The chemical heater reactant formulation of claim 1 further including an agent for increasing the rate of penetration of cupric chloride reaction solution into the aluminum source selected from the group consisting of a liquid polyethylene glycol having an average molecular weight of 200 and a 10% aqueous solution of sodium dioctyl sulfosuccinate.

3. The formulation of claim 2 wherein the agent for increasing the rate of penetration of the reaction solution is a liquid polyethylene glycol having an average molecular weight of 200.

4. The formulation of claim 3 wherein the cupric chloride reaction solution consists essentially of 48.4% by weight cupric chloride dihydrate, 9.7% by weight water, 40.3% by weight ethylene glycol and 1.6% polyethylene glycol having an average molecular weight of 200.

5. A method for chemically generating heat through the exothermic reduction of cupric chloride by aluminum comprising the steps of forming a reaction solution of cupric chloride, ethylene glycol as a solvent for said cupric chloride and water and subsequently contacting said reaction solution with a source of aluminum selected from the group consisting of aluminum foil, an aluminum powder-paper composition and aluminum powder, to initiate an exothermic reduction reaction and thus generate heat for a sustained period of time at temperatures in the order of 150° C.

6. A method according to claim 5 wherein an agent selected from the group consisting of a liquid polyethylene glycol having an average molecular weight of 200 and a 10% aqueous solution of sodium dioctyl sulfosuccinate is incorporated within the reaction solution to increase the rate of penetration of the reaction solution into the aluminum source, thereby increasing the rate of heat generation.

7. A method according to claim 6 wherein the agent for increasing the rate of penetration of the reaction solution is a liquid polyethylene glycol having an average molecular weight of 200.

8. The method of claim 7 wherein the reaction system solution consists essentially of 48.4% by weight cupric chloride dihydrate, 9.7% by wt. water 40.3% by weight ethylene glycol and 1.6% by weight polyethylene glycol having an average molecular weight of 200.

* * * * *